(12) United States Patent
Priest

(10) Patent No.: US 10,707,001 B2
(45) Date of Patent: Jul. 7, 2020

(54) SOLENOID ACTUATOR WITH FAST ANALOG CONTROLLED ECONOMIZER

(71) Applicant: TE CONNECTIVITY CORPORATION, Berwyn, PA (US)

(72) Inventor: Marcus Priest, Carpinteria, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 337 days.

(21) Appl. No.: 15/797,962

(22) Filed: Oct. 30, 2017

(65) Prior Publication Data
US 2019/0131047 A1 May 2, 2019

(51) Int. Cl.
H01F 7/06 (2006.01)
G01P 15/00 (2006.01)
H01H 47/00 (2006.01)
H01H 47/32 (2006.01)

(52) U.S. Cl.
CPC ............ H01F 7/064 (2013.01); G01P 15/001 (2013.01); H01H 47/002 (2013.01); H01H 47/325 (2013.01); H01H 2047/006 (2013.01); H01H 2047/009 (2013.01)

(58) Field of Classification Search
CPC .............. H01H 47/002; H01H 47/325; H01H 2047/006; H01H 2047/009; G01P 15/001; H01F 7/064
USPC ......................................................... 361/170
See application file for complete search history.

(56) References Cited

U.S. PATENT DOCUMENTS 5,513,832 A 5/1996 Becker et al.
5,853,028 A 12/1998 Ness et al.

FOREIGN PATENT DOCUMENTS

DE 10 2011 079547 A1 1/2013
DE 10 2014 203424 A1 9/2015
GB 2 275 541 A 8/1994

OTHER PUBLICATIONS

Machine translation of Fuessl German Patent Document DE 102011079547 A1 Jan. 24, 2013 (Year: 2013).*
Machine translation of Galamb German Patent Document DE 102014203424 A1 Sep. 10, 2015 (Year: 2015).*
International Search Report, International Application No. PCT/IB2018/058487, International Filing Date, Oct. 30, 2018.

* cited by examiner

Primary Examiner — Kevin J Comber

(57) ABSTRACT

A method of regulating the operation of an electrical system. The electrical system includes, a load, at least one sensor coupled to the load configured to measure at least one characteristic of the load, a solenoid having at least one coil, at least one sensor coupled to the solenoid coil configured to measure at least one characteristic of the coil. A control circuit is coupled to the at least one load sensor and the at least one coil sensor, and includes a memory. The method includes receiving, by the control circuit, at least one load characteristic from the at least one load sensor, determining, by the control circuit, a force sufficient to maintain an electrical contact, based on the at least one load characteristic, and regulating, by the control circuit, a coil current, based on the force and based on the at least one characteristic of the coil.

20 Claims, 5 Drawing Sheets

SOLENOID ACTUATOR WITH FAST ANALOG CONTROLLED ECONOMIZER

FIELD OF THE INVENTION

The present invention is directed to solenoids. More particularly, the present invention is directed to solenoids having improved operability during adverse conditions.

BACKGROUND OF THE INVENTION

Solenoids are frequently employed in electronic circuits to provide rapid switching. Conventional solenoids employ both a contact spring and armature spring. The contacting force generated by the opposing springs limits the available contact force and ability to prevent open circuits due to impacts and current surges.

BRIEF DESCRIPTION OF THE INVENTION

In an embodiment, a method of regulating the operation of an electrical system. The electrical system includes, a load, at least one sensor coupled to the load and configured to measure at least one characteristic of the load, a solenoid having at least one coil, at least one sensor coupled to the solenoid coil and configured to measure at least one characteristic of the coil, and a control circuit coupled to the at least one load sensor and the at least one coil sensor, and including a memory. The method includes receiving, by the control circuit, at least one load characteristic from the at least one load sensor. The method also includes determining, by the control circuit, a force sufficient to maintain an electrical contact, based on the load characteristic regulating, by the control circuit, a coil current, based on the force.

In another embodiment, a method of regulating the operation of an electrical system. The electrical system including, a load, at least one sensor coupled to the load and configured to measure at least one characteristic of the load, a solenoid having at least one coil, at least one sensor coupled to the solenoid coil and configured to measure at least one characteristic of the coil, at least one sensor configured to measure acceleration, and a control circuit coupled to the at least one load sensor, the at least one coil sensor, and the at least one acceleration sensor, and including a memory. The method includes receiving, by the control circuit, at least one acceleration measurement from the at least one acceleration sensor. The method also includes determining, by the control circuit, a force sufficient to maintain an electrical contact, based on the acceleration and regulating, by the control circuit, a coil current, based on the force.

In another embodiment, a solenoid control system comprising a control circuit and memory storing instructions that, when executed by the control circuit, cause the solenoid control system to receive at least one measured characteristic of an electrical circuit from at least one sensor, wherein the electrical circuit and the at least one sensor are part of a solenoid system. The solenoid control system then determines a force sufficient to maintain an electrical contact based on the at least one measured characteristic and regulates the operation of a solenoid based on the force.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a method of controlling the operation of a solenoid switch. Embodiments of the present disclosure, for example, in comparison to concepts failing to include one or more features disclosed herein, provide for the control of a solenoid switch under adverse conditions. The method provides for detection of a potential impact as well as for detection of current surges which can affect the ability of the solenoid to maintain a completed circuit. The method also includes regulating the operation of the solenoid to avoid an open circuit.

Figure 1:
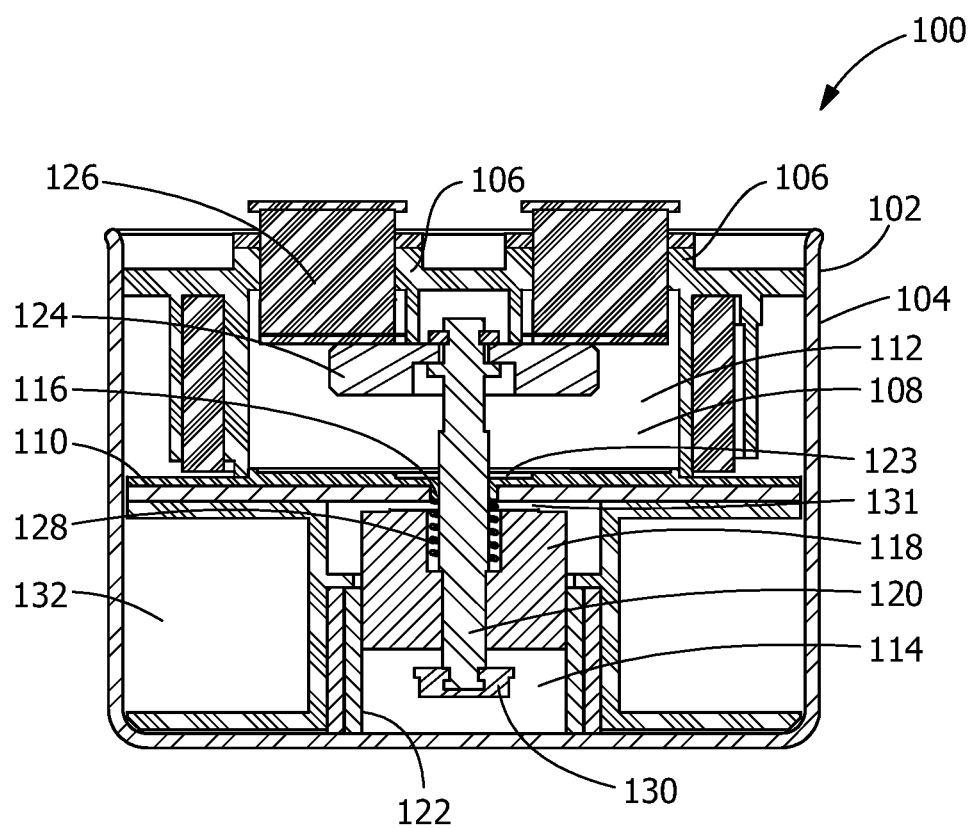
FIG. 1 is a perspective view of a solenoid, according to an embodiment.

An embodiment of a solenoid assembly 100 is shown in FIG. 1. The solenoid assembly 100 includes housing 102 having a housing wall 104 including at least one aperture 106 extending through the housing wall 104. The housing wall 104 further defines a cavity 108. A partition 110 is positioned in the cavity 108 and defines at least two regions 112, 114 within the cavity 108. The partition 110 further includes a partition aperture 116 positioned to allow communication between the at least two regions 112, 114.

The solenoid assembly 100 further includes an armature 118 positioned within the cavity 108. The armature 118 further includes a central bore 120. The armature 118 is slidably positioned via a bearing 122, allowing the central bore 120 to slidably extend through the partition aperture 116, along guide 123, into both of the at least two regions 112, 114. An electrical contact 124 is attached to the central bore 120 and configured to be in selective communication with a fixed electrical contact 126 such that the central bore 120 may be selectively positioned to allow communication between the electrical contact 124 and the fixed electrical contact 126. The fixed electrical contact 126 may be further configured to selectively communicate with an external circuit (not shown) via the at least one aperture 106.

The armature 118 further includes an armature spring 128 positioned in the region 114. The armature spring 128 is attached to both the partition 110 and armature 118. The armature spring 128 is configured to apply an armature spring force to the armature 128. The armature spring force is directed against both the partition 110 and armature 118 in order to move the armature 118 to an extended position when the coil current is small. The armature spring force may cause the armature 118 to slidably at least partially retract through the partition aperture 116 which may selectively position the armature 118 such that the electrical contact 124 and fixed electrical contact 126 will not be in communication. A retaining clip 130 is added to an end of the central bore 120 to transfer an impact between the armature 118 and the electrical contact 124 during movement of the armature 118, in order to allow for an increased parting force and velocity. An air gap 131 between the armature 118 and the partition 110 is maintained, allowing the magnetic force present on the armature 118 to be directly coupled to the electrical contact 124.

The solenoid assembly 100 further includes an electrically conductive coil 132 positioned within the housing 102 and configured to apply a magnetic force to the armature 118 in response to a coil current within the electrically conductive coil 132. The magnetic force may be in opposition to the armature spring force acting on the armature 118. The magnetic force may cause the armature 118 to slidably at least partially extend through the partition aperture 116, which may selectively position the armature 118 such that the electrical contact 124 and fixed electrical contact 126 will be in communication. The rapidity of the mechanical movement of the armature 118, in response to the magnetic force, determines how quickly the solenoid assembly 100 will respond to the application of the coil current. A typical response time for a solenoid is about $5 \times 10^{-2}$ to $2 \times 10^{-4}$ seconds.

Figure 2:
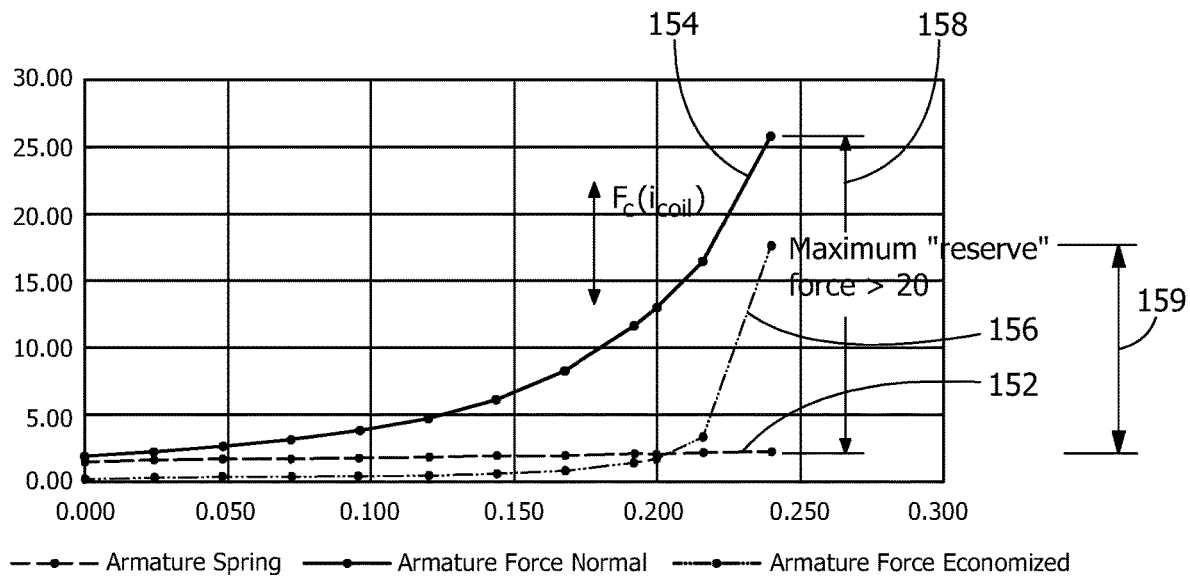
FIG. 2 is an illustration of the forces on a solenoid armature, according to an embodiment.

FIG. 2 illustrates forces upon an armature, according to an embodiment. In the example of FIG. 2, the forces acting on the armature include an armature spring force 152, and a magnetic force 154. The magnetic force 154, generated by a first coil current within the electrically conductive coil 132, overcomes the armature spring force 152 causing the armature 118 to be selectively positioned such that the electrical contact 124 and the fixed electrical contact 126 will be in communication. Following the selective positioning of the armature 118 the magnetic force 154 may be economized by reducing the coil current within the electrically conductive coil 132 to a second coil current. An economized magnetomotive coil force 156 is sufficient to maintain the communication between the electrical contact 124 and the fixed electrical contact 126. A difference between the magnetic force 154 and the armature spring force 152 can be considered a maximum reserve force 158 which can be reapplied be reapplying the first coil current and thus the magnetic force 154. The difference between the economized magnetomotive coil force 156 and the armature spring force 152 is an economized reserve force 159. The economized reserve force 159 upon the armature 118 is directly applied to the electrical contacts 124 due to the air gap 131. In some embodiments, the economized reserve force 159 applied to the electrical contacts 124 is much larger than the force achieved in a conventional two spring configuration, such as described in FIG. 3 below. The second coil current is typically less than the first coil current which may result in energy and cost savings during operation.

Figure 3:
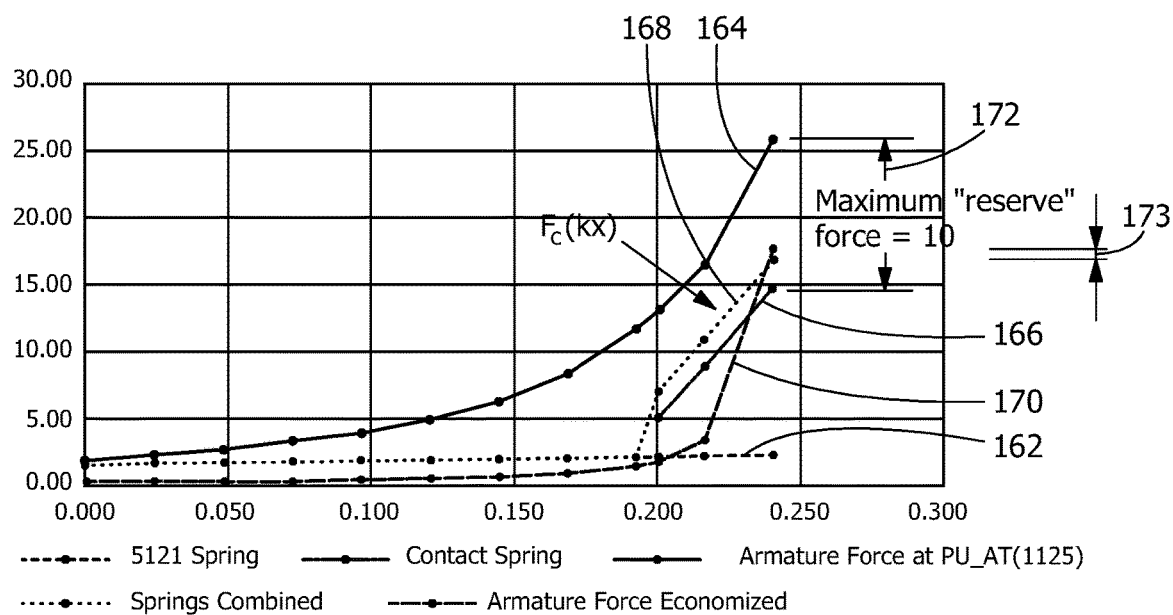
FIG. 3 is an illustration of the forces on a comparative solenoid armature.

FIG. 3 illustrates forces upon an armature for a comparative solenoid employing both an armature spring and contact spring. In the example of FIG. 3, the forces acting on the armature include an armature spring force 162, a magnetomotive coil force 164 generated by a first comparative coil current, and a contact spring force 166. A combined spring force 168 due to the armature spring force 162 and the contact spring force 166 represents the net spring force acting on the armature. An economized magnetomotive coil force 170, generated by a second comparative coil current, having a magnitude similar to the economized magnetomotive coil force 156 is also illustrated. The difference between the economized magnetomotive coil force 170 and the combined spring force 168 is an economized reserve force 173. As illustrated in FIG. 3 the difference between the magnetomotive coil force 164 and the economized magnetomotive coil force 170 represented as a reserve force 172 is much smaller than the reserve force 158 illustrated in FIG. 2. As such the comparative configuration of FIG. 3 results in a smaller net armature force and smaller contact force than the inventive example of FIG. 2, consequently, resulting in reduced mechanical shock resistance and reduced resistance to transient currents.

Figure 4:
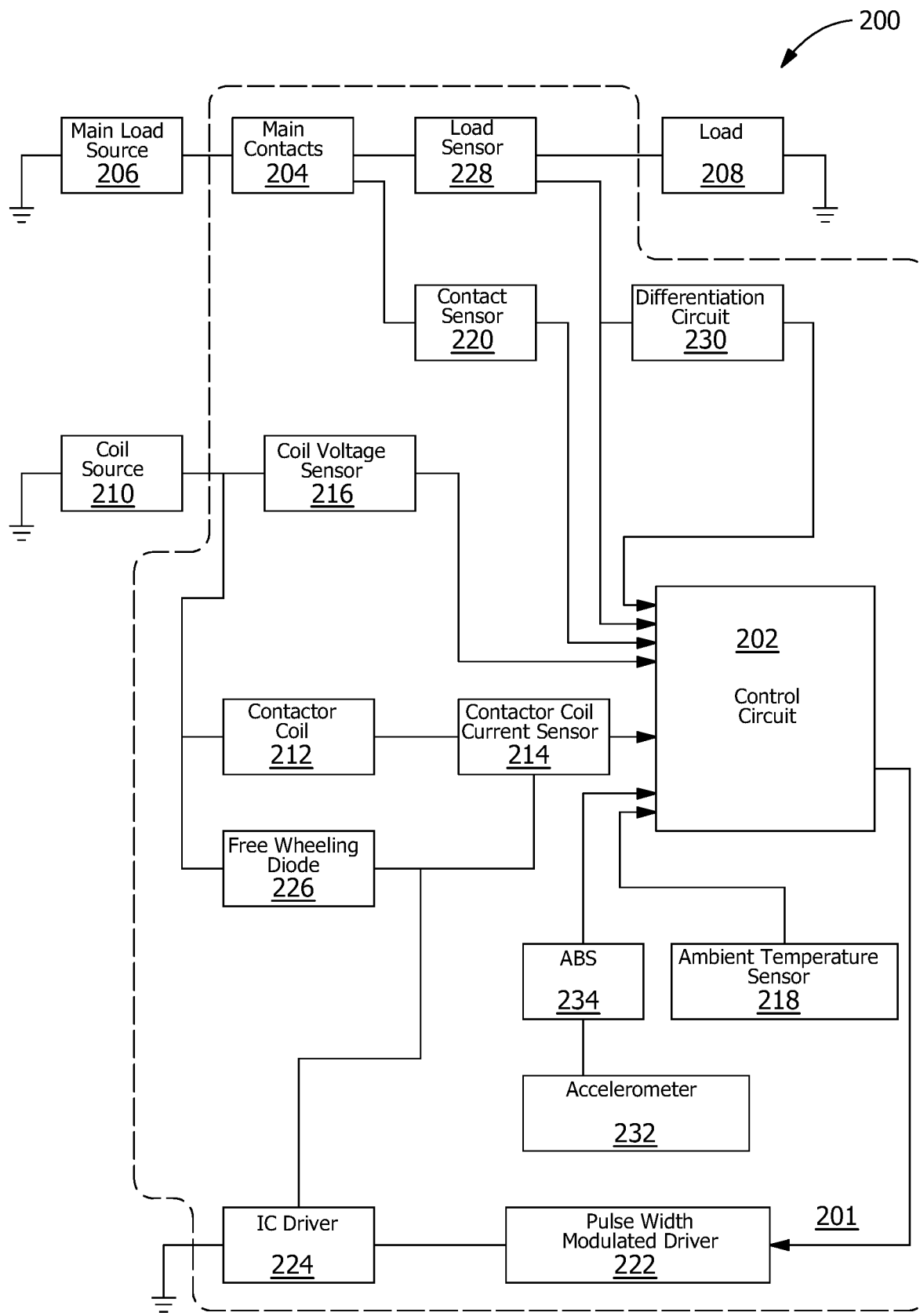
FIG. 4 is a block diagram of an electrical system, according to an embodiment.

FIG. 4 is a block diagram of an electrical system 200, according to an embodiment. The electrical system 200 includes a solenoid assembly 201. In some embodiments, the solenoid assembly 201 may include the solenoid assembly 100. A control circuit 202, regulates the operation of the solenoid assembly 201 by causing the main contacts 204 to close, allowing current from a main load source 206 to flow through a load 208. In some embodiments, the control circuit 202 may be an analog control circuit. In some embodiments, the control circuit 202 may include a microcontroller having a microprocessor and a memory. In one embodiment, the main contacts 204 may include the electrical contact 124 and fixed electrical contact 126. In some embodiments, the control circuit 202 may regulate the operation of the electrical system at least in part by applying a coil current from a coil source 210 to a contactor coil 212 (i.e., an actuator). In some embodiments, the contactor coil 212 may include the electrically conductive coil 132. In one embodiment, the control circuit 202 may apply a coil current to the electrically conductive coil 132, which may selectively position the armature 118 such that the electrical contact 124 and fixed electrical contact 126 will be in communication. In some embodiments, the solenoid assembly 201 may include one or more of a contactor coil current sensor 214, a contactor coil voltage sensor 216, and an ambient temperature sensor 218. In some embodiments, the solenoid assembly 201 may include a contact sensor 220 configured to monitor the position of the main contacts 204. In one embodiment, the contact sensor 220 may monitor a position of the armature 118.

In an embodiment, a suitable method for applying the coil current may include a pulse width modulated current source. In the example of FIG. 4, the control circuit 202 may regulate a pulse width modulated driver 222 which modulates an IC driver 224 to act as a pulse width modulated current switch. In some embodiments, the IC driver 224 may include a MOSFET. In some embodiments, the IC driver 224 may include an insulated gate bipolar transistor (IGBT). In some embodiments, the solenoid assembly 201 may additionally include a free wheeling diode 226 in parallel with the contactor coil 212 configured to recover energy stored in the coil during pulse width modulation "off time".

The control circuit 202 may additionally regulate the operation of the solenoid assembly 201 in order to prevent the interruption of operation due to adverse conditions (e.g., power surges, current spike, and/or impacts). In the example of FIG. 4, the control circuit 202 receives at least one load characteristic (e.g., current, and/or voltage) from a load sensor 228. A differentiation circuit 230 determines the time rate of change of the at least one load characteristic. In some embodiments, the differentiation circuit 230 determines the time rate of change of at least the load current. In some embodiments, the differentiation circuit 230 may be external to the control circuit 202. In some embodiments, differentiation circuit 230 may be integral with the control circuit 202.

A rapid increase in the load current (e.g., power surge, and/or current spike) may cause dynamic levitation of the main contacts 204 resulting in an open circuit. In order to rapidly respond to a change in the load current, the data from the load sensor 228 may be rapidly sampled. In some embodiments, the load sensor 228 may be digitally sampled at a sampling rate of at least 3 MHz, at least 3.5 MHz, at least 4 MHz, less than 10 MHz, less than 8 MHz, less than 6 MHz, less than 5 MHz, and combinations thereof. In another embodiment, the load sensor 228 may be sampled using an analog circuit. If a power surge or current spike is detected the control circuit 202 may regulate the coil current to the contactor coil 212 thereby increasing the coil force upon the armature 118 to an amount sufficient to prevent the loss of communication between the electrical contact 124 and fixed electrical contact 126.

In the example of FIG. 4, the control circuit 202 may receive at least one acceleration measurement from an accelerometer 232. An ABS circuit 234 may be included to determine a magnitude of the acceleration measurement. In some embodiments, the ABS circuit 234 may be external to the control circuit 202. In some embodiments, ABS circuit 234 may be integral with the control circuit 202. In order to rapidly respond to a rapid acceleration, the data from the accelerometer 232 may be rapidly sampled. In some embodiments, the accelerometer 232 may be digitally sampled at a sampling rate of at least 50 Hz, at least 300 Hz, at least 600 Hz, about 1 kHz, less than 1.4 kHz, less than 2 kHz, and combinations thereof. In another embodiment, the accelerometer 232 may be sampled using an analog circuit.

A rapid acceleration and/or deceleration (e.g., fall, and/or impact) may cause movement of the armature 118 resulting in an open circuit. If a rapid acceleration and/or deceleration (e.g., fall, and/or impact) is detected the control circuit 202 may regulate the coil current to the contactor coil 212 thereby increasing the coil force upon the armature 118 to an amount sufficient to prevent the loss of communication between the electrical contact 124 and fixed electrical contact 126.

Figure 5:
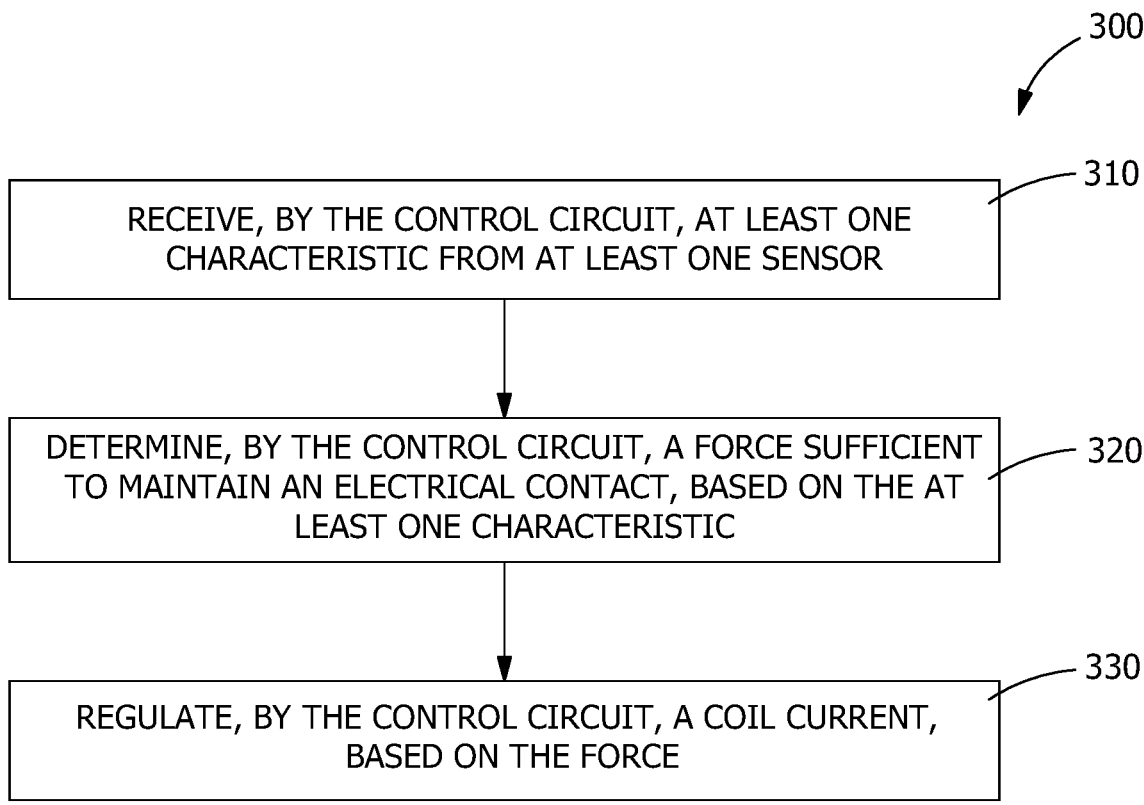
FIG. 5 is a flow chart of a method of controlling the operation of an electrical system, according to an embodiment.

FIG. 5 is a flow chart of a method of regulating an electrical system 300. At block 310, a control circuit receives at least one load characteristic from at least one sensor. At block 320, the control circuit determines a force sufficient to maintain an electrical contact, based on the at least one characteristic. At block 330, the control circuit regulates a coil current, based on the force required to maintain electrical contact.

Figure 6:
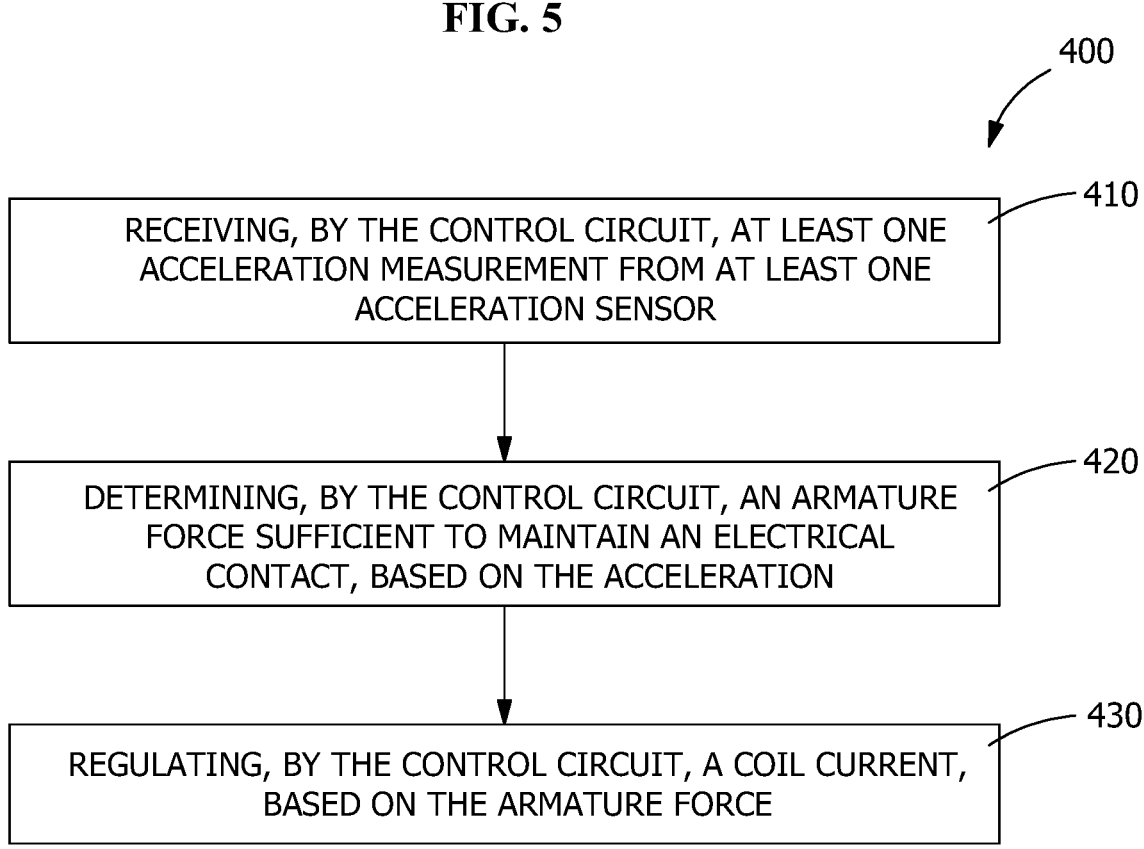
FIG. 6 is a flow chart of a method of controlling the operation of an electrical system, according to an embodiment.

FIG. 6 is a flow chart of a method of regulating an electrical system 400. At block 410, the control circuit receives at least one acceleration measurement from at least one acceleration sensor. At block 420, the control circuit determines an armature force sufficient to maintain an electrical contact, based on the acceleration. At block 430, the control circuit regulates a coil current, based on the armature force required to maintain electrical contact.

Figure 7:
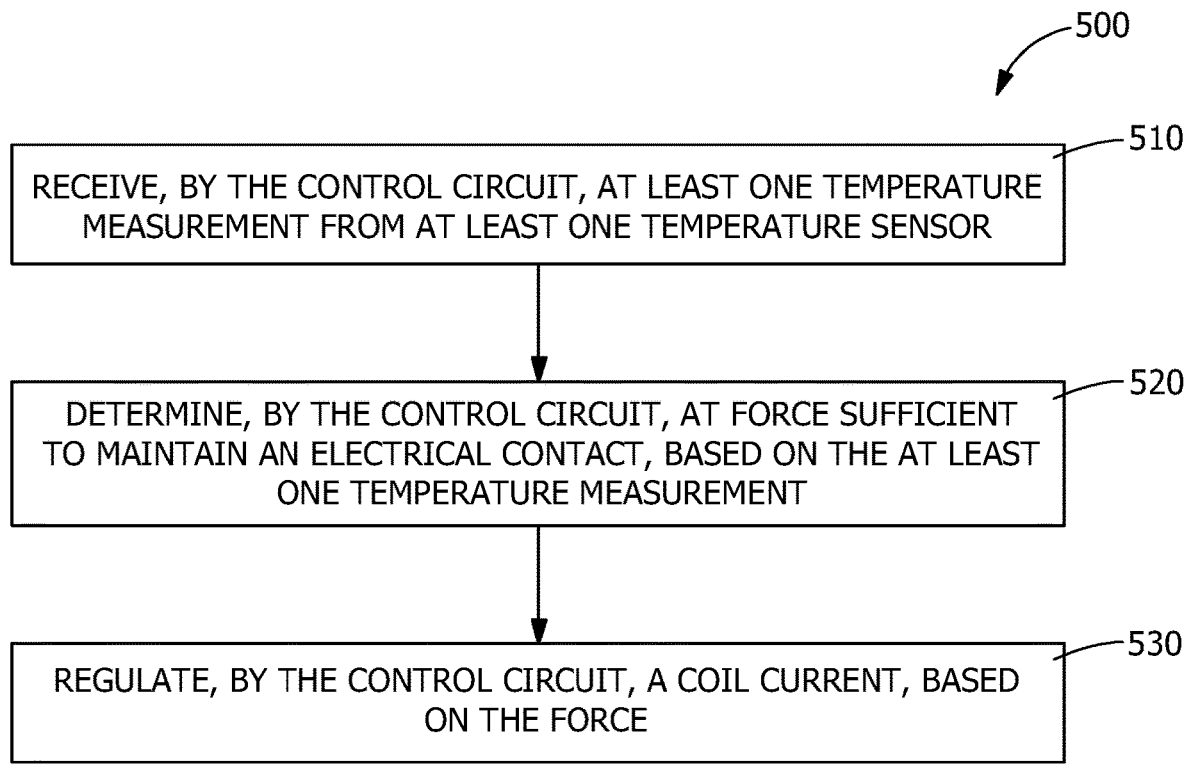
FIG. 7 is a flow chart of a method of controlling the operation of an electrical system, according to an embodiment.

FIG. 7 is a flow chart of a method of regulating an electrical system 500. At block 510, the control circuit receives at least one temperature measurement from at least one temperature sensor. At block 520, the control circuit determines a force sufficient to maintain an electrical contact, based on the at least one temperature measurement. At block 530, the control circuit regulates a coil current, based on the force required to maintain electrical contact.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of regulating the operation of an electrical system, the electrical system including, a load, at least one sensor coupled to the load and configured to measure at least one characteristic of the load, a solenoid having at least one coil, at least one sensor coupled to the coil and configured to measure at least one characteristic of the coil, and a control circuit coupled to the at least one load sensor and the at least one coil sensor, and including a memory, the method comprising:
    receiving, by the control circuit, at least one load characteristic from the at least one load sensor;
    determining, by the control circuit, a force sufficient to maintain an electrical communication, based on the at least one load characteristic; and
    regulating, by the control circuit, a coil current, based on the force.

2. The method of claim 1, wherein the at least one load characteristic includes a load current.

3. The method of claim 2, wherein the determining the force includes determining a time rate of change of the load current.

4. The method of claim 1, wherein the regulating the coil current includes pulse width modulation.

5. The method of claim 1, wherein the electrical system further includes at least one sensor configured to measure acceleration coupled to the control circuit.

6. The method of claim 5, wherein the determining the force is further based on the acceleration.

7. The method of claim 1, wherein the force sufficient to maintain the electrical communication is less than a magnetic force minus an armature force.

8. The method of claim 7, wherein an electrical contact and a fixed electrical contact are in communication during the electrical communication.

9. A method of regulating the operation of an electrical system, the electrical system including, a load, at least one sensor coupled to the load and configured to measure at least one characteristic of the load, a solenoid having at least one coil, at least one sensor coupled to the solenoid coil and configured to measure at least one characteristic of the coil, at least one sensor configured to measure acceleration, and a control circuit coupled to the at least one load sensor, the at least one coil sensor, and the at least one acceleration sensor, and including a memory, the method comprising:
    receiving, by the control circuit, at least one acceleration measurement from the at least one acceleration sensor of the solenoid;
    determining, by the control circuit, a force sufficient to maintain an electrical communication, based on the acceleration; and
    regulating, by the control circuit, a coil current, based on the force.

10. The method of claim 9, further comprising receiving, by the control circuit, at least one load characteristic from the at least one load sensor.

11. The method of claim 10, wherein the determining the force includes determining a time rate of change of a load current received from the at least one load sensor.

12. The method of claim 10, wherein the determining the force is further based on the at least one load characteristic.

13. The method of claim 9, wherein the regulating the coil current includes pulse width modulation.

14. The method of claim 9, wherein the force sufficient to maintain the electrical communication is less than a magnetic force minus an armature force.

15. The method of claim 14, wherein an electrical contact and a fixed electrical contact are in communication during the electrical communication.

16. A solenoid control system comprising a memory storing instructions that, when executed, cause the solenoid control system to receive at least one measured characteristic of an electrical circuit from at least one sensor, wherein the electrical circuit and the at least one sensor are part of a solenoid system;
   determine a force sufficient to maintain an electrical communication based on the at least one measured characteristic;
   regulate the operation of a solenoid based on the force.

17. The system of claim 16, wherein regulate the operation of a solenoid includes a pulse width modulated current.

18. The system of claim 16, wherein the solenoid system further comprises a load;
   and wherein the at least one measured characteristic includes a load current.

19. The system of claim 16, further comprising an air gap between the armature and a partition during the electrical contact.

20. The system of claim 19, wherein the force sufficient to maintain the electrical communication is less than a magnetic force.

* * * * *